United States Patent
Hammes et al.

(10) Patent No.: US 7,361,753 B2
(45) Date of Patent: Apr. 22, 2008

(54) METHOD FOR THE PRODUCTION OF EASILY WETTED, WATER-SOLUBLE, POWDERED AT LEAST ALKYLATED NON-IONIC CELLULOSE ETHERS

(75) Inventors: Alf Hammes, Goersroth (DE); Reinhard Doenges, Bad Soden (DE)

(73) Assignee: SE Tylose GmbH & Co. KG, Wiesbaden (DE)

( * ) Notice: Subject to any disclaimer, the term of this patent is extended or adjusted under 35 U.S.C. 154(b) by 0 days.

(21) Appl. No.: 10/257,434

(22) PCT Filed: Apr. 12, 2001

(86) PCT No.: PCT/EP01/04260

§ 371 (c)(1),
(2), (4) Date: May 5, 2003

(87) PCT Pub. No.: WO01/77183

PCT Pub. Date: Oct. 18, 2001

(65) Prior Publication Data

US 2004/0110942 A1 Jun. 10, 2004

(30) Foreign Application Priority Data

Apr. 12, 2000 (DE) .............. 100 18 155

(51) Int. Cl.
*C08B 11/02* (2006.01)
*C08B 37/00* (2006.01)
*C07H 1/06* (2006.01)

(52) U.S. Cl. .......... 536/84; 536/99; 536/100; 536/124; 536/127

(58) Field of Classification Search .......... 536/84, 536/99, 100, 124, 127
See application file for complete search history.

(56) References Cited

U.S. PATENT DOCUMENTS

| | | | |
|---|---|---|---|
| 2,647,064 A | 7/1953 | Anderson et al. | 106/179 |
| 2,720,464 A | 10/1955 | Anderson et al. | 106/197 |
| 3,619,451 A * | 11/1971 | Gill | 264/109 |
| 4,501,887 A * | 2/1985 | Kornrumpf et al. | 536/84 |
| 4,845,206 A * | 7/1989 | Thomson et al. | 536/84 |

FOREIGN PATENT DOCUMENTS

| | | |
|---|---|---|
| CA | 1084913 | 9/1980 |
| DE | 27 10 309 | 9/1977 |
| DE | 27 50 148 | 11/1977 |
| DE | 258613 A1 * | 7/1988 |
| DE | 4112849 * | 10/1991 |
| EP | 374125 A2 * | 6/1990 |
| GB | 1 553 134 | 9/1979 |
| WO | WO 99/47249 | 9/1999 |
| WO | WO 00/34382 | 6/2000 |

OTHER PUBLICATIONS

Ullmann's Encyclopedia of Industrial Chemistry, vol. A5, "Cellulose ethers", Verlag Chemie, Weinheim, , 5th edition, 1986, pp. 419-459.
Organic Chemistry, Morrison & Boyd, 1973, Publishers: Allyn & Bacon, Inc. pp. 556-558.
English abstract for DE 2750148, Nov. 9, 1977.
English abstract for JP 59-75902 Apr. 28, 1984.
English absract for JP 11-322801, Nov. 26, 1999.
English abstract for CN 1149643, May 22, 2001.
K. Engelskirchen: "Polysaccharid-Derivate (Polysaccharide derivatives)" in Houben Weyl, vol. E20/III, 4th edition, Georg Thieme Verlag Stuttgart, 1987, pp. 2042-2182, See p. 1 of Specification.
Ullmann's Encyclopedia of Industrial Chemistry, vol. A5, "Cellulose ethers", Verlag Chemie, Weinheim, , 5th edition, 1986, pp. 461-488.
March, Jerry, Advanced Organic Chemistry, Reactions, Mechanisms and Structures, $3^{rd}$ Ed. John Wiley & Sons, 1855, New York, pp. 684-685; 1058-1061.

* cited by examiner

*Primary Examiner*—Shaojia Anna Jiang
*Assistant Examiner*—Everett White
(74) *Attorney, Agent, or Firm*—Robert & Robert, LLP

(57) ABSTRACT

The invention relates to a method for the production of at least alkylated, non-ionic cellulose ethers, whereby at least 10% of all hydroxy groups contained therein are alkylated and which may flocculate in water, within a temperature range of 45 to 95° C. The invention is characterized in that at least one surfactant in solid, liquid, or solution form is added to the cellulose for production of the cellulose ether.

19 Claims, No Drawings

METHOD FOR THE PRODUCTION OF EASILY WETTED, WATER-SOLUBLE, POWDERED AT LEAST ALKYLATED NON-IONIC CELLULOSE ETHERS

The present invention relates to a process for preparing water-soluble, pulverulent, at least alkylated, nonionic cellulose ethers which are preferably coagulable in water having a temperature in the range from 35 to 95° C. and are modified with surfactants before conversion of the cellulose to the cellulose ether in such a manner that, owing to the improved wettability, substantially lump-free stir-in of the cellulose ether in cold water results.

The preparation of cellulose ethers having uniform or different substituents is known (see, for example, Ullmann's Enzyklopädie der Technischen Chemie, Vol. 9, "Celluloseether", Verlag Chemie, Weinheim, 4th edition 1975, p. 192ff; K. Engelskirchen: "Polysaccharid-Derivate" in Houben Weyl, Vol. E 20/III, 4th ed., Georg Thieme Verlag Stuttgart, 1987, p. 2042 ff).

To prepare these cellulose ethers, for example methylcellulose, methylhydroxyethylcellulose, methylhydroxypropylcellulose and ethylhydroxyethylcellulose, the starting material, the cellulose, is initially milled to increase the surface area and the resulting particle size should generally be less than 2.5 mm, if possible even less than 1 mm. The resulting, voluminous cellulose powder is converted by addition of base, for example NaOH, KOH, LiOH and/or $NH_4OH$, in solid or liquid form, to the alkali metal cellulose. This is followed, with or without isolation of the alkali metal cellulose, by a one- or multistage, continuous or batchwise, etherification with the appropriate reagents. The resulting cellulose ethers are purified using water or suitable solvent mixtures in a known manner to remove the reaction by-products, dried and milled and optionally admixed with other components.

Despite the good solubility of alkylated cellulose ethers in cold water, the preparation of aqueous solutions of them frequently presents a problem. This is true in particular when the cellulose ether is a fine powder having increased surface area because rapid viscosity development is desired. When such a fine cellulose ether powder comes into contact with water, the individual particles swell and accumulate to form relatively large agglomerates whose surface area is coagulated in a gel-like manner. However, depending on the mixing intensity, there is a certain proportion of completely unwetted cellulose ether in the interior of these agglomerates. Depending on the viscosity of the resulting solution and the average polymer chain length, complete dissolution of these agglomerates in the case of highly viscous products may take up to 24 hours.

In order to minimize the problem described which occurs in preparing aqueous solutions of cellulose ethers, various solutions have been suggested:

The cellulose ether powder can be sprinkled into water at a temperature above the coagulation point of the corresponding cellulose ether and then cooled gradually. The cellulose ether then distributes evenly in the water without forming lumps before it gradually goes into solution as the temperature falls. However, such a process is time-intensive and requires an apparatus to heat the water.

When direct stir-in of the cellulose ether in cold water without lumping is desired, glyoxal, for example, can be used in preparing the cellulose ether to obtain partial, reversible crosslinking which leads to the formation of hemiacetals having free hydroxyl groups of the cellulose ether. On dissolution in neutral or weakly acidic water, the hemiacetal is cleaved after a time delay and a sharp viscosity increase without lumping occurs only after distribution of the powder in the aqueous medium. The length of the time delay can be adjusted quite precisely via the degree of crosslinking. However, disadvantages of this variant are the additional working step in preparing the cellulose ether, i.e. the crosslinking, and also the time-delayed viscosity increase.

A further possibility for improving the stir-in of cellulose ethers in cold water is to treat them with surfactants which contain lauroyl radicals. In this process described in U.S. Pat. No. 2,647,064 and U.S. Pat. No. 2,720,464, cellulose ethers are treated with surfactants in aqueous suspension at a temperature above the coagulation point of the cellulose ether, so that the resulting products contain surfactants adsorbed on the surface which results in improved stir-in. The material may be treated with surfactants either in the course of aqueous workup to free it of reaction by-products and salt or by redispersion of cellulose ethers in hot aqueous systems at a temperature above the coagulation point of the cellulose ether. Spraying of the surfactant onto the damp cellulose ether during the centrifugation which serves to remove the aqueous medium from the cellulose ether is also disclosed. However, a considerable disadvantage of the process described is the necessary use of excess surfactant in the hot aqueous suspension of the cellulose ether. Only a small portion of the surfactant used is adsorbed on the cellulose ether. According to the examples of U.S. Pat. No. 2,720,464, this proportion is only from 3 to 6%. Since it cannot be disposed of with the washing water and also for reasons of cost, the substantial proportion of the nonadsorbed surfactant has to be recycled or recovered. Furthermore, the hot, aqueous surfactant solution foams very vigorously while the cellulose ether is removed. In addition, an opportunity has to be found in the process for adding and mixing the mixture of surfactant and water at a point in time at which in general no reagent is added.

WO 99/47249 discloses the achievement of improved dispersibility and wettability of hydrocolloids by dry admixing of surfactants with material heated to above its melting point. As well as the additional apparatus demands for such a process, the even distribution of small amounts of surfactant is problematic.

In JP-A-11/322 801, glycols and/or nonionic surfactants having HLB values of from 3 to 17 are sprayed onto cellulose ethers in order to improve the stir-in of the cellulose ethers. HLB means "hydrophilic lipophilic balance" and is a measure for the polarity of the surfactants and their ability to form oil-in-water or water-in-oil emulsions.

In CN-A-1 149 643, polyanionic cellulose ethers, for example carboxymethyl-cellulose, are prepared by alkalizing cellulose using a base solution containing a surfactant, and etherifying, aftertreating and spinning it.

JP-B-89/038 403 describes the use of different surfactants in amounts of from 0.1 to 10% in preparing hydroxyethylcellulose in organic solvents, in particular isopropanol and tert-butanol. In comparison to products which have been prepared without the addition of surfactants, the resulting products show an improved clear solubility.

It is an object of the present invention to provide a process for preparing at least alkylated, nonionic cellulose ethers which are preferably coagulable in water having a temperature in the range from 35 to 95° C. and delivers products which are notable for their improved wetting and stir-in behavior in cold, aqueous solutions. The process shall not have the disadvantages of the prior art, require no additional aggregates or process steps and guarantee the purification of the products to remove reaction by-products and salts by washing with an excess of water at a temperature above the coagulation point of the cellulose ether, but below 100° C.

This object is achieved by the addition before conversion to the cellulose ether of at least one surfactant to the cellulose in the course of metering in the reactants required for the preparation of the cellulose ether.

The present invention accordingly provides a process for preparing at least alkylated, nonionic cellulose ethers in which at least 10% of all hydroxyl groups are alkylated and which are coagulable in water in a temperature range of from 45 to 95° C., preferably from 50 to 95° C. and more preferably from 65 to 95° C., and are converted to the cellulose ether by
a) activating the cellulose by alkalization in the presence of water, base and organic dispersing auxiliary,
b) etherifying the activated cellulose in a one- or multistage process using an etherifying agent by a Williamson ether synthesis and
c) purifying the product in a subsequent purification step by washing with water which has a temperature above the coagulation point of the cellulose ether to remove reaction by-products and salts, which comprises adding at least one surfactant in solid, liquid and/or dissolved form before the cellulose is converted to the cellulose ether.

For the purposes of the present invention, coagulability means that at least 90% by weight of the cellulose ether is insoluble in water at a given temperature.

The cellulose ethers prepared according to the invention have an improved wettability and accordingly have a lower tendency to form lumps when preparing aqueous solutions.

It has been found to be unimportant whether the surfactant is metered in as an aqueous solution or in a solution or dispersion together with the organic dispersing auxiliary used. The surfactant used is completely and evenly adsorbed by the cellulose, irrespective of the type of surfactant. The effect is equally marked for anionic surfactants and for neutral or cationic surfactants, and equally for surfactants having high HLB values and surfactants having low HLB values, irrespective of the precise structure.

Surprisingly, it has been found that in spite of the very good solubility and complete miscibility with water of the surfactants used, they remain completely in the product even after conversion to the cellulose ether, even though it would have been expected that the aqueous workup to remove the reaction by-products, salts and dispersing auxiliaries at elevated temperature and large water excess (parts by weight ratio from 5:1 to 100:1, based on the cellulose ether) would lead to the surfactants being washed out at least virtually completely. Accordingly, no surfactant could be detected in the washing water used for the washing.

With respect to wettability and lump-free stir-in, the cellulose ethers prepared according to the invention have similar properties at comparable surfactant doping to the cellulose ethers which, according to the processes of JP-A-11/322 801, U.S. Pat. No. 2,647,064 and U.S. Pat. No. 2,720,464, have been treated with surfactants only after conversion to the cellulose ether. However, the process according to the invention does not have the disadvantages of the prior art, in particular the high surfactant loss of the processes described in the American patents.

The maximum ratio of organic dispersing auxiliary used to cellulose is preferably 25:1, more preferably 15:1.

Useful organic dispersing auxiliaries include all dispersing auxiliaries disclosed by the literature for this application purpose, but preferably aliphatic and cyclic ethers, for example dimethyl ether, diethyl ether, dibutyl ether, dimethoxyethane, 1,4-dioxane or tetrahydrofuran.

The maximum water content in the reactant mixture during alkalization should preferably be 25 molar equivalents, more preferably 15 molar equivalents, based on the amount of cellulose used, and in particular be in the range from 2 to 5 molar equivalents.

A maximum of 20% by weight, preferably a maximum of 10% by weight and more preferably a maximum of 1% by weight, of surfactant, based on the amount of cellulose used, are added. Surprisingly, it was found that the use of even small surfactant amounts of about 0.01% by weight, based on the amount of cellulose used, have an effect with regard to the rapidity and evenness of viscosity development on stir-in in cold water. It is equally surprising that the use of a surfactant quantity of from about 1% by weight, based on the amount of cellulose used, has a virtually maximum effect with regard to the rapidity and evenness of viscosity development on stir-in in cold water. The surfactant is generally added before the base is added.

Preference is given to metering in the surfactant in the form of an aqueous solution of any desired concentration. Furthermore, it is also conceivable to add the surfactant in solid or liquid form to the organic dispersing auxiliary or to meter it directly into the mixture.

Preference is given to using surfactants whose wetting ability by DIN 53901 at 20° C. is less than 10 g of active substance/l, preferably less than 5 g of active substance/l and more preferably less than 2 g of active substance/l. Furthermore, particular preference is given to using those surfactants which reduce the surface tension of aqueous solutions by at least 20%.

Particular preference is given to using anionic surfactants, for example phosphoric acid mono- and diesters having long-chain, branched alkylpolyethylene glycol ether groups, sulfates, for example sodium dodecyl sulfate or sodium cetyl stearyl sulfate, alkylphenol polyglycol ether sulfates, sorbitan oleates, alkanesulfonates, cationic surfactants, for example coconut alkyldimethylbenzylammonium chloride or dicoconut dimethylammonium chloride, neutral surfactants, for example polyether-modified polysiloxanes or alkylphenol polyglycol ethers, and also betaines, for example fatty acid amidoalkyl betaine or N,N-distearyl-N-methyl-N-(3-sulfopropyl)ammonium betaine.

The cellulose ethers prepared according to the invention can be stirred into cold water without lumps when the mixing energy is sufficient. When the mixing energy is insufficient, a lower degree of lumping occurs and accordingly a more rapid and more even viscosity development, as is the case in products which have been converted to the cellulose ether without the use of surfactants. This statement applies in particular to the case of very finely divided products where more than 90% of all particles have a diameter of less than 180 µm.

The process according to the invention is further described hereinbelow using examples without being restricted thereby:

EXAMPLES NO. 1 to 3, 5 TO 17 AND 18 (COMPARATIVE)

Preparation of the Cellulose Ethers without the Addition of Surfactants

In a reactor having a horizontal mixing shaft, 100 parts by weight of a wood pulp a, b or c (ground to 0.5 mm) in 350 parts of dimethoxyethane are admixed with such an additional quantity of water and 58.3 parts of a 49.3% sodium hydroxide solution that the total water content in the mixture of the reactants after addition of the sodium hydroxide solution is 42.05 parts, based on the cellulose. After the addition of the sodium hydroxide solution, the cellulose is alkalized for an appropriate period of time, in general from 30 minutes to 2 hours, at a suitable temperature and then reacted at from 60 to 80° C. with a sufficient quantity of ethylene oxide to obtain the appropriate degree of hydroxyethyl substitution (MS). A second portion of 49.3% sodium hydroxide solution and then the amount of methyl chloride which corresponds to the sum of the molar equivalent amounts of both sodium hydroxide portions, based on the amount of cellulose used, are then added and the reaction continues at from 90 to 100° C. until the appropriate degree of methyl group substitution is attained.

After the end of the reaction, the organic dispersing auxiliary is distilled out of the reaction mixture under reduced pressure and the resulting crude product is washed with hot water of a temperature above the coagulating point of the corresponding cellulose ether until the material has been completely purified to remove reaction by-products and the salt content is below 1%. However, a total of at least 10 times the quantity of water is used for washing the cellulose ether with boiling water.

The resulting crude products are then further treated as follows:

EXAMPLE NO. 1, 12 AND 17 (COMPARATIVE)

Preparation Variant A (Without Addition of Surfactant)

The resulting crude products without the addition of surfactant are dried, ground, sieved and backmixed to the desired particle size distribution. The particle size distribution of the products tested is as follows: 75%<63 μm, 20% from 63 to 100 μm and 5% from 100 to 125 μm.

EXAMPLE NO. 2, 3, 5 TO 11, 13 AND 18 (COMPARATIVE)

Preparation B: Admixing of Surfactant to the Crude Product Analogous to U.S. Pat. No. 2,720,464, Column 6, Lines 34 to 39

100 g of crude product (absolutely dry, i.e. corrected for moisture) are intimately kneaded for 30 minutes with 5 g of a solution or suspension of surfactant in water corresponding to the weight ratios of surfactant stated in the tables, based on the cellulose ether (absolutely dry), dried, ground, sieved and backmixed to the desired particle size distribution.

EXAMPLE NO. 4, 14 to 16 AND 19

Preparation Variant C: Preparation of Cellulose Ethers using Surfactants (Process According to the Invention)

The same procedure as described for the preparation of the cellulose ethers without the addition of surfactants is carried out, except that the appropriate quantity of surfactant in percent by weight, based on the amount of cellulose used, is added to the reactant mixture in aqueous solution or suspension before addition of the sodium hydroxide solution.

Surfactant amounts used:

| Example No. | Surfactant | Amount used [parts by weight] |
|---|---|---|
| 4 | A | 0.2 |
| 14 | D | 0.2 |
| 15 | G | 0.2 |
| 16 | A | 1.0 |
| 19 | A | 0.2 |

The crude product resulting from the reaction is treated as described above for preparation variant A.

The viscosity development when the cellulose ether is dissolved, which correlates directly with the extent of lumping, is recorded in a Brabender viscometer at 20° C. in the following manner:

The cellulose ethers are used as a very fine powder having the following particle size distribution: 75% having a particle size of <63 μm, 20% having a particle size of from 63 to 100 μm and 5% having a particle size of from 100 to 125 μm. Depending on the achievable end viscosity, an appropriate amount of cellulose ether is intimately mixed in a vessel for 10 seconds with the appropriate amount of water to a final weight of 430 g with stirring using an Ultra-Turrax® at 8 000 rpm. The water has a temperature of 20+/−1° C. The solution is then transferred in the course of a maximum of 5 seconds to a viscometer from Brabender and the measurement is started. The viscosity development in [BE] (Brabender units) which is directly proportional to the corresponding viscosity in mPas (according to Brookfield) is recorded with the support of software for a maximum of 3 hours and evaluated.

Tables 1 and 3 make clear that for the tendency to lump and the resulting viscosity development of cellulose ethers on stir-in in cold water, it is unimportant whether the surfactant in the form of a solution is intimately mixed with the damp cellulose ether (examples 3 and 18 in analogy to U.S. Pat. No. 2,720,464, column 6, lines 34 to 39) or added directly to the reactant mixture before the conversion to the cellulose ether (examples 4 and 19).

TABLE 1

Viscosity development/dissolution behavior in the Brabender viscometer at 20° C.
Material: methylhydroxyethylcellulose based on wood pulp a; viscosity: 39 000 mPas (1.9%, absolutely dry, measured using a Brookfield RVT viscometer); weight 3 g (absolutely dry)

| Ex. No. | Surfactant | Amount of surfactant used [%] | Preparation variant | Theoretical end viscosity[1] [BE] | 20% EV[2] [min] | 50% EV[2] [min] |
|---|---|---|---|---|---|---|
| 1 | — | — | A | 795 | 17 | — |
| 2 | A | 0.01 | B | 795 | 5.5 | — |
| 3 | A | 0.2 | B | 795 | 1 | 4.5 |
| 4 | A | 0.2 | C | 795 | 1 | 4.5 |
| 5 | A | 1.0 | B | 795 | 0.5 | 1 |
| 6 | A | 5.0 | B | 795 | 0.5 | 1 |
| 7 | B | 0.2 | B | 795 | 0.5 | 4 |
| 8 | C | 0.2 | B | 795 | 0.5 | 2 |
| 9 | D | 0.2 | B | 795 | 0.5 | 4 |
| 10 | E | 0.2 | B | 795 | 0.5 | 2 |
| 11 | F | 0.2 | B | 795 | 0.5 | 2.5 |

[1] theoretical achievable viscosity under the conditions selected in Brabender units [BE] on complete dissolution of the cellulose ether
[2] time in minutes until achievement of 20 or 50% of the achievable end viscosity in [BE]; a dash in the table means that the appropriate viscosity level was not attained owing to comparatively extensive lumping even after a measuring time of 180 minutes Surfactant A: anionic surfactant: sodium 2-ethylhexylsulfonate; solubility in water: 300 g/l
Surfactant B: anionic surfactant: sodium dialkyl sulfosuccinate; soluble in water
Surfactant C: cationic surfactant: dicoconut dimethylammonium chloride; soluble in water
Surfactant D: neutral surfactant: EO/PO block polymer; soluble in water
Surfactant E: neutral surfactant: nonylphenol polyglycol ether; soluble in water
Surfactant F: betaine: N,N-distearyl-N-methyl-N-(3-sulfopropyl)ammonium betaine; solubility in water: <10 g/l

TABLE 2

Viscosity development/solubility behavior in Brabender viscometer at 20° C.
Material: methylhydroxyethylcellulose based on wood pulp b; viscosity 23 000 mPas (1.9%, absolutely dry, measured with a Brookfield viscometer); weight 4.3 g (absolutely dry)

| Ex. No. | Surfactant | Amount of surfactant used [%] | Preparation variant | Theoretical end viscosity. [BE] | 20% EV [min] | 50% EV [min] |
|---|---|---|---|---|---|---|
| 12 | — | — | A | 1000 | 4 | — |
| 13 | A | 0.2 | B | 1000 | 1 | 3 |
| 14 | D | 0.2 | C | 1000 | <0.5 | 1 |
| 15 | G | 0.2 | C | 1000 | 1 | 2 |
| 16 | A | 1.0 | C | 1000 | <0.1 | 0.5 |

Surfactant G: cationic surfactant: coconut alkyldimethylbenzylammonium chloride; soluble in water

TABLE 3

Viscosity development/solubility behavior in a Brabender viscometer at 20° C.
Material: methylhydroxyethylcellulose based on wood pulp c; viscosity 5 000 mPas (1.9%, absolutely dry, measured with a Brookfield viscometer); weight 5.0 g (absolutely dry)

| Ex. No. | Surfactant | Amount of surfactant used [%] | Preparation variant | Theoretical end viscosity [BE] | 20% EV [min] | 50% EV [min] | 80% EV [min] |
|---|---|---|---|---|---|---|---|
| 17 | — | — | A | 700 | 1.5 | 56 | — |
| 18 | A | 0.2 | B | 700 | 0.5 | 1 | 1.5 |
| 19 | A | 0.2 | C | 700 | <0.3 | 0.5 | 1 |

In comparison to table 1, tables 2 and 3 show that when the particle size distribution and mixing energy introduced are identical, the degree of lumping and accordingly also the viscosity development depend on the average polymer chain length. Cellulose ethers having relatively short average polymer chain lengths dissolve more quickly and more evenly, and accordingly, when the mixing energy is insufficient and partial lumping occurs, have a more even viscosity development than cellulose ethers having relatively long average polymer chain lengths.

However, irrespective of the end viscosity, improved wetting and lump-free stir-in behavior is observed once surfactants are added to the reactant mixture to be alkalized.

The invention claimed is:

1. A process for preparing an alkylated, nonionic cellulose ether product comprising:
   a) activating cellulose by alkalization in the presence of water, base and organic dispersing auxiliary to provide activated cellulose in a reaction mixture by adding at least one surfactant to the reaction mixture, such that the at least one surfactant is added to the reaction mixture prior to addition or the base into the reaction mixture;
   b) etherifying the activated cellulose using an etherifying agent by a Williamson ether synthesis to provide etherified cellulose; and,
   c) purifying the etherified cellulose by washing with water at a temperature above the coagulation point of the etherified cellulose to remove reaction by-products and salts to provide said cellulose ether product;
   wherein at least 10% of all hydroxyl groups are alkylated, and which cellulose ether product is coagulable in water in a temperature range of from 45 to 95° C.

2. The process as claimed in claim 1, wherein a maximum ratio of organic dispersing auxiliary to cellulose is 25:1.

3. The process as claimed in claim 1, wherein a maximum water content in the reactant mixture during the alkalization is 25 molar equivalents, based on the amount of cellulose used.

4. The process as claimed in claim 1, wherein a maximum of 20% by weight of surfactant, based on the amount of cellulose used, is introduced before addition of the base to the reaction mixture.

5. The process of claim 1, wherein the surfactant comprises a wetting ability as measured by DIN 53901 at 20° C. of less than 10 g of active substance/l.

6. The process of claim 1 wherein the at least one surfactant is in solid, liquid and/or dissolved form.

7. The process of claim 1 wherein the etherifying step occurs in a single stage or multistage process.

8. The process of claim 1 wherein the at least one surfactant comprises an anionic surfactant.

9. The process of claim 1 wherein the organic dispersing auxiliary is selected from the group consisting of aliphatic and cyclic ethers.

10. The process of claim 1 wherein the at least one surfactant comprises from 0.01 to 1.0 weight percent based on the amount of cellulose in the reaction mixture.

11. The process of claim 1 in which at least 10% of all cellulose hydroxyl groups are alkylated and converted to a cellulose ether product which is coagulable in water in a temperature range of from 45 to 95° C.

12. The process of claim 1 wherein the organic dispersing auxiliary comprises an aliphatic ether or cyclic ether.

13. The process of claim 1 wherein the organic dispersing auxiliary comprises dimethyl ether, diethyl ether, dibutyl ether, dimethoxyethane, 1,4-dioxane or tetrahydrofuran.

14. The process of claim 1 wherein the base comprises NaOH, KOH, LiOH and/or NH$_4$OH.

15. The process of claim 1, wherein the non-ionic cellulose ether product further comprises oxalkylated hydroxyl groups.

16. The process of claim 1, wherein the non-ionic cellulose ether product is a methyl hydroxyethyl cellulose, a methyl hydroxypropyl cellulose or an ethyl hydroxyethyl cellulose.

17. A process for preparing an alkylated, nonionic cellulose ether product comprising:
   a) activating cellulose by alkalization in the presence of water, base and organic dispersing auxiliary to provide activated cellulose in a reaction mixture by adding from 0.01 to 1.0 weight percent based on the cellulose of at least one surfactant to the reaction mixture, such that the at least one surfactant is added to the reaction mixture prior to addition of the base into the reaction mixture;

b) etherifying the activated cellulose using an etherifying agent by a Williamson ether synthesis to provide etherified cellulose; and, c) purifying the etherified cellulose by washing with water at a temperature above the coagulation point of the etherified cellulose to remove reaction by-products and salts to provide said cellulose ether product;

wherein at least 10% of all hydroxyl groups are alkylated, and which cellulose ether product is coagulable in water in a temperature range of from 45 to 95° C.

18. The process of claim 17 wherein the surfactant is selected from the group consisting of phosphoric acid mono- and diesters having long-chain branched alkylpolyethylene glycol ether groups, sodium dodecyl sulfate, sodium cetyl stearyl sulfate, alkylphenol polyglycol ether sulfates, sorbitan oleates, alkanesulfonates, coconut alkyldimethylbenzylammonium chloride, dicoconut dimethylammonium chloride, polyether-modified polysiloxanes, alkylphenol polyglycol ethers, fatty acid amidoalkyl betaine, N,N-distearyl-N-methyl-N-(3-sulfopropyl)ammonium betaine, and mixtures thereof.

19. The process of claim 17 wherein the organic dispersing auxiliary comprises an adiphatic ether or cycile ether.

* * * * *